United States Patent Office 3,373,164
Patented Mar. 12, 1968

3,373,164
DIFLUORAMINO-1-DIMETHANESULPHONYL-PIPERAZINES
Godfrey Fort, Ardrossan, Scotland, assignor, by mesne assignments, to the United States of America as represented by the Secretary of the Navy
No Drawing. Filed Feb. 2, 1966, Ser. No. 524,972
Claims priority, application Great Britain, Feb. 5, 1965, 5,216/65
13 Claims. (Cl. 260—268)

This invention relates to novel difluoramino-1,4-dimethanesulphonylpiperazines and to their preparation. These compounds are useful energetic constituents of high energy propellent compositions.

In accordance with the process of the invention, difluoramino-1,4-dimethanesulphonylpiperazine is prepared by reacting 2,3,5,6-tetrahydroxy-1,4-dimethanesulphonylpiperazine, or an ester or ether derivative thereof, with difluoramine in an inert atmosphere in the presence of an acidic condensing agent.

The term "inert atmosphere" is used herein to denote an atmosphere substantially free from any constituent, such as oxygen, which reacts with difluoramine.

The preferred acidic condensing agent is sulphuric acid which is especially effective because of its solvent action on the starting material. To avoid possible decomposition of the piperazine derivative used as starting material, it is preferable to mix this material with the difluoramine before adding sulphuric acid. When the reaction is carried out in this manner the initial piperazine derivative dissolves in the acid and the product separates from the reaction medium as a crystalline solid.

If the acidic condensing agent is also a strong dehydrating agent such as, for example, 96% by weight sulphuric acid, the fully difluoraminated compound 2,3,5,6-tetrakis(difluoramino)-1,4-dimethanesulphonylpiperazine is formed in high yield, whereas if the acidic condensing agent is a weak dehydrating agent such as, for example, 80% by weight aqueous sulphuric acid, the formation of the partially difluoraminated compound bis(difluoramino)-dihydroxy-1,4-dimethanesulphonylpiperazine is favoured. This latter compound is believed to be predominantly the symmetrical isomer 2,5-bis(difluoramino)-3,6-dihydroxy-1,4-dimethanesulphonylpiperazine, although it may be a mixture of isomers.

The reaction of 2,3,5,6-tetrahydroxy-1,4-dimethanesulphonylpiperazine to the fully difluoraminated product may be represented as:

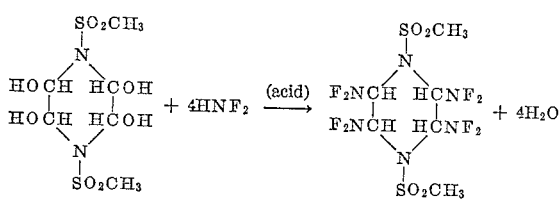

The 2,3,5,6-tetrahydroxy-1,4-dimethanesulphonylpiperazine used as starting material in the process may be prepared by reacting glyoxal with methane sulphonamide in the presence of an alkaline catalyst as described in copending application Ser. No. 520,663, filed Jan. 14, 1966.

The reaction may conveniently be carried out either under autogenous pressure at room temperature or under atmospheric pressure at a reduced temperature. A convenient procedure is to carry out the reaction under conditions of difluoramine reflux at atmospheric pressure, i.e. at about −23° C.

The invention is further illustrated by the following examples in which all parts and percentages are by weight.

Example 1

In a 3-necked flask were placed 82 parts of 2,3,5,6-tetrahydroxy-1,4-dimethanesulphonylpiperazine. The flask was fitted with a reflux condenser cooled with solid carbon dioxide/acetone, a gas inlet tube extending to the bottom of the flask and a tap-funnel for addition of sulphuric acid. A mixture of nitrogen and difluoramine was passed through the gas inlet tube until 400 parts of difluoramine had been added. The flow of nitrogen was maintained and the difluoramine allowed to reflux for 1 hour. 370 parts of 96% sulphuric acid were added from the tap-funnel and the mixture reacted with continuous refluxing of the difluoramine for 4 hours. The condenser temperature was allowed to rise to room temperature and unreacted difluoramine was vented off in a stream of nitrogen. The solid difluoraminated product was insoluble in the sulphuric acid and was isolated by pouring on to excess crushed ice, filtering off the product and washing thoroughly with cold water. After drying in a vacuum desiccator over phosphorus pentoxide, 100 parts (84% of theory) of white, crystalline solid were obtained which decomposed at 210° C. after darkening above 145° C. After recrystallisation from hot acetonitrile the purified solid melted with decomposition at 235–240° C. after darkening above 165° C. It was found to contain C, 16.0%; H, 2.69%; N, 18.5%; F, 35.4%; S, 15.2%. 2,3,5,6-tetrakis(difluoramino)-1,4-dimethanesulphonylpiperazine, $C_6H_{10}F_8N_6O_4S_2$, requires C, 16.1%; H, 2.24%; N, 18.8%; F, 34.1%; S, 14.4%.

The infra-red spectrum was determined on a dispersion of the product in a high-boiling petroleum fraction and showed strong absorption at 7.4, 7.8, 8.15, 9.2, 10.2, 10.4–10.6, 11.05, 11.35, 11.6–11.7, 13.1 and $14.85\mu$ and weaker absorption at 7.2, 7.6, 8.1 and $10.0\mu$. The strong bands at 11.05 and $11.7\mu$ were not present in the starting material and are in the 10–12 region in which compounds containing $F_2N$ groups show absorption.

The proton magnetic resonance spectrum of the product in acetone solution, using tetramethylsilane as internal reference, showed a triplet centred at $3.95\tau$, with a coupling constant of 21 cycles per second, which is consistent with the spectrum of the hydrogen nuclei of a piperazine ring. The $^{19}F$ nuclear magnetic resonance spectrum of the material in acetone solution showed a pair of doublets centred at 41.3 parts per million and 38.7 parts per million to low field of the fluorotrichloromethane internal reference, with coupling constants of 18 and 14 cycles per second, respectively. This spectrum is consistent with the spectrum of $^{19}F$ nuclei of difluoramino groups attached to a carbon atom in a cyclic structure.

No ignition occurred when a ½ kg. mild steel hammer was dropped from a height of 20 cm. on to a thin layer of the finely divided product on a mild steel anvil, but ignition occurred when the height was 40 cm. When a 0.1 g. sample was heated to 250° C. in an open, round-bottomed glass tube at a rate of 5° C. per minute no ignition occurred. When ignited, the product burned rapidly.

Example 2

5 parts of difluoramine were refluxed for 8 hours on to 2.05 parts of 2,3,5,6-tetrahydroxy-1,4-dimethanesulphonylpiperazine. 5 parts of 80% sulphuric acid were added to the mixture approximately one hour after the difluoramine reflux started. The excess difluoramine was vented off overnight in a stream of nitrogen. The residual liquid, which contained some solid, was poured on to 30 parts of ice. The solid was filtered off, washed with water, 1% aqueous sodium bicarbonate and water and dried to give 1.33 parts (53% of theory) of a solid. Recrystallisation from hot acetonitrile gave crystals melting with sudden decomposition at 184° C. A further recrystallisation from hot ethanol raised the melting point to 188° C. The crystals were found to contain C, 19.8%; H, 3.5%; F, 21.6%; N, 14.2%; S, 18.1%. Bis(difluoramino)dihydroxy - 1,4 - dimethanesulphonylpiperazine, $C_6H_{12}F_4N_4O_6S_2$, requires C, 19.2%; H, 3.2%; F, 20.2%; N, 14.9%; S, 17.0%.

The infra-red spectrum was determined on a dispersion of the product in a high-boiling petroleum fraction and showed strong absorption at 2.85, 7.4, 7.5, 8.65, 9.1, 10.8–10.9, 11.45 and 12.9$\mu$, medium absorption at 7.1, 7.9, 8.4, 9.25, 10.35 and 15.0$\mu$ and weak absorption at 9.9 and 10.15$\mu$.

Acetylation of 3 parts bis(difluoramino)dihydroxy-1,4-dimethanesulphonylpiperazine with 75 parts of acetic acid, 75 parts of acetic anhydride and 1 part of 96% sulphuric acid left at 20° C. overnight gave 2.2 parts (59% of theory) of precipitate which decomposed at approximately 200° C. Recrystallisation of the precipitate from hot acetonitrile gave crystals which decomposed in the range 210–220°, and which were found to contain C, 26.8%; H, 3.8%; F, 19.2%; N, 12.5%; S, 13.8%. Diacetoxybis(difluoramino) - 1,4 - dimethanesulphonylpiperazine, $C_{10}H_{16}F_4N_4O_8S_2$, requires: C, 26.1%; H, 3.5%; F, 16.5%; N, 12.2%; S, 13.9%.

The infra-red spectrum of the acetate derivative was determined on a dispersion of the derivative in a high-boiling petroleum fraction, and showed strong absorption at 5.7, 7.4, 8.4, 8.6, 9.8, 10.2, 10.5, 10.7, 11.3 and 12.9$\mu$, medium absorption at 7.6, 9.0, 10.0 and 11.5$\mu$ and weak absorption at 7.1, 7.8 and 8.1$\mu$.

*Example 3*

Treatment of 0.82 part of bis(difluoramino)dihydroxy-1,4-dimethanesulphonylpiperazine, prepared as in Example 2 above, with 5 parts of difluoramine and 5 parts of 96% sulphuric acid by the method described in Example 1 gave 0.81 part (83% of theory) of 2,3,5,6-tetrakis(difluoramino)1,4-dimethanesulphonylpiperazine having an infra-red spectrum identical to that of the product of Example 1.

What is claimed is:

1. The compound difluoramino - 1,4 - dimethanesulphonylpiperazine.
2. The compound bis(difluoramino)dihydroxy-1,4-dimethanesulphonylpiperazine.
3. The compound 2,3,5,6-tetrakis(difluoramino)-1,4-dimethanesulphonylpiperazine.
4. The compound diacetoxybis(difluoramino)-1,4-dimethanesulphonylpiperazine.
5. A process for the preparation of difluoramino-1,4-dimethanesulphonylpiperazine which comprises reacting a compound selected from the group consisting of 2,3,5,6-tetrahydroxy-1,4-dimethanesulphonylpiperazine, a partial difluoraminated derivative thereof and an acetic ester derivative thereof, with difluoramine in an inert atmosphere in the presence of an acidic condensing agent.
6. A process as claimed in claim 5 wherein the acidic condensing agent comprises sulphuric acid.
7. A process as claimed in claim 5 wherein the piperazine derivative used as starting material is mixed with difluoramine before the sulphuric acid is added.
8. A process as claimed in claim 5 wherein the reaction is carried out either under autogenous pressure at room temperature or under atmospheric pressure at a reduced temperature.
9. A process as claimed in claim 5 wherein the reaction is carried out under conditions of difluoramine reflux at atomspheric pressure.
10. A process for the preparation of 2,3,5,6-tetrakis-(difluoramino) - 1,4 - dimethanesulphonylpiperazine as claimed in claim 5 wherein the acidic condensing agent is also a strong dehydrating agent.
11. A process as claimed in claim 10 wherein the acidic condensing agent is 96% by weight sulphuric acid.
12. A process for the preparation of bis(difluoramino)dihydroxy-1,4-dimethanesulphonylpiperazine as claimed in claim 5 wherein the acidic condensing agent is a weak dehydrating agent.
13. A process as claimed in claim 12 wherein the acidic condensing agent is 80% by weight aqueous sulphuric acid.

References Cited

UNITED STATES PATENTS

| | | | |
|---|---|---|---|
| 3,162,263 | 12/1964 | Olstowski | 260—248 |
| 3,196,167 | 7/1965 | Logothetis | 260—397.2 |

OTHER REFERENCES

Erickson et al., J. Heterocyclic Chem. vol. 1, No. 5, December 1964, pp. 257–259.

ALEX MAZEL, *Primary Examiner.*

C. D. QUARFORTH, *Examiner.*

L. S. SEBASTIAN, D. G. DAUS, *Assistant Examiners.*